(12) United States Patent
Kachi

(10) Patent No.: US 7,207,639 B2
(45) Date of Patent: Apr. 24, 2007

(54) IMAGE RECORDING APPARATUS AND METHOD

(75) Inventor: Yasuhiko Kachi, Kaiseimachi (JP)

(73) Assignee: Fujifilm Corporation, Minami-Ashigara-shi, Kanagawa (JP)

( * ) Notice: Subject to any disclaimer, the term of this patent is extended or adjusted under 35 U.S.C. 154(b) by 336 days.

(21) Appl. No.: 10/940,727

(22) Filed: Sep. 15, 2004

(65) Prior Publication Data

US 2005/0057593 A1    Mar. 17, 2005

(30) Foreign Application Priority Data

Sep. 16, 2003  (JP) .............................. 2003-323389

(51) Int. Cl.
*B41J 29/38* (2006.01)
(52) U.S. Cl. .......................... 347/14; 347/19
(58) Field of Classification Search ...................... None
See application file for complete search history.

(56) References Cited

U.S. PATENT DOCUMENTS 5,870,114 A    2/1999  Numata et al.

FOREIGN PATENT DOCUMENTS

| JP | 401184156 A | * | 7/1989 |
| JP | 3-261580 | | 11/1991 |
| JP | 5-58012 A | | 3/1993 |
| JP | 2001-096874 A | | 4/2001 |
| JP | 2003-216371 A | | 7/2003 |

* cited by examiner

*Primary Examiner*—Thinh Nguyen
(74) *Attorney, Agent, or Firm*—Birch, Stewart, Kolasch & Birch, LLP

(57) ABSTRACT

The image recording apparatus records images on a recording medium by performing relative movement of the recording medium and a recording head provided with image recording elements, and controlling driving of the image recording elements according to image data, and the apparatus comprises: a recording medium size determination device which determines a size of the recording medium to be used; a magnification setting device which sets magnification in order to generate an image larger than the size of recording medium according to input image data and the size of the recording medium determined by the recording medium size determination device; a first image processing device which generates image data with a size larger than the size of the recording medium from the input image data in accordance with the magnification set by the magnification setting device; a recording medium determination device which is disposed further upstream from the recording head in a relative movement direction of the recording medium by the relative movement and which acquires recording medium information including shape, orientation, and position of the recording medium; a second image processing device which generates image data with a size equal to or smaller than a recording medium area indicated by the recording medium information according to the recording medium information from the image data generated by the first image processing device; and a recording control device which controls the recording head according to the image data generated by the second image processing device, and records on the recording medium the image indicated by the image data.

22 Claims, 16 Drawing Sheets

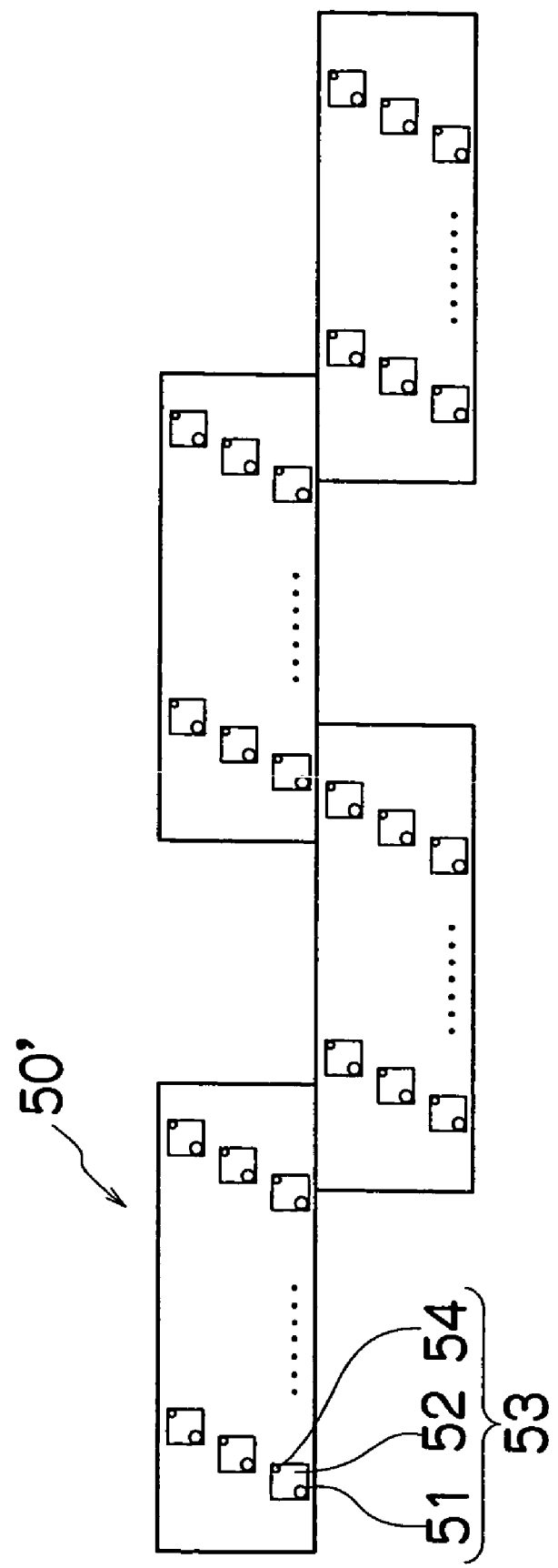

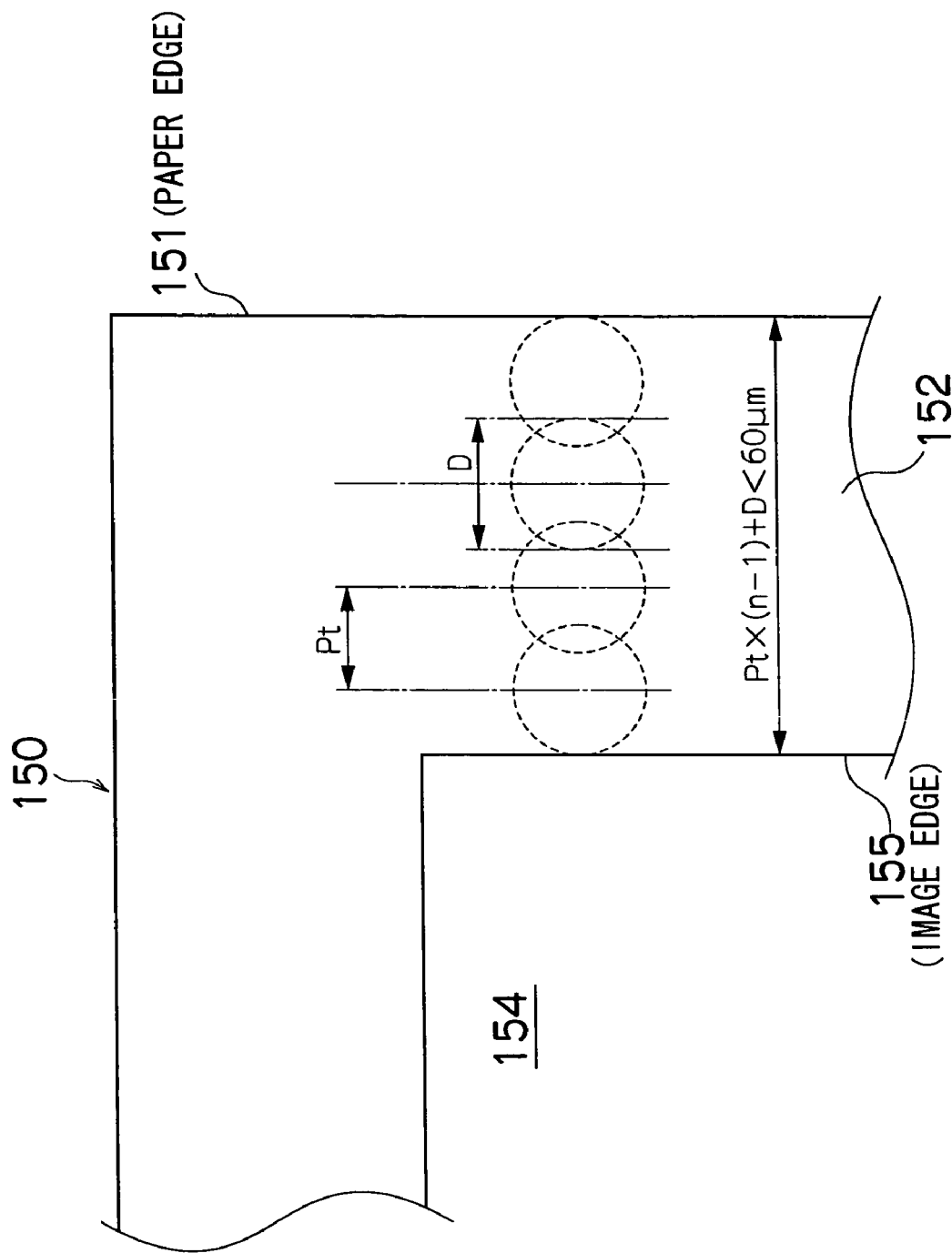

IMAGE RECORDING APPARATUS AND METHOD

This Non-provisional application claims priority under 35 U.S.C. § 119(a) on Patent Application No(s). 2003-323389 filed in Japan on Sep. 16, 2003, the entire contents of which are hereby incorporated by reference.

BACKGROUND OF THE INVENTION

1. Field of the Invention

The present invention relates to an image recording apparatus and method; more specifically, to an image recording apparatus and image recording method suitable for creating marginless printouts whereby images are recorded on the entire print surface of a recording medium without leaving margins in the peripheral edges of the recording medium.

2. Description of the Related Art

Disclosed in Japanese Patent Application Publication No. 5-58012 is a shuttle head-type inkjet recording apparatus that prints images as a recording head reciprocally moves in the direction (paper width direction) perpendicular to the conveyance direction of the recording medium, the apparatus having a configuration in which a paper width determination device is disposed on the recording head carriage, the width of the paper (recording medium) is determined with the paper width determination device, and the image recording operation is controlled based on the determined paper width. On the other hand, disclosed in Japanese Patent Application Publication No. 2001-96874 is an image recording method in which ink or another image formation substance is transferred to solely the area in which an image-receiving medium is present according to information about the area in which the image receiving medium (recording medium) is present.

However, the inkjet recording apparatus disclosed in Japanese Patent Application Publication No. 5-58012 entails conveying a recording medium to a predetermined position on the platen, and prevents printing directly to the platen by controlling the image recording information according to the paper width determination signal. The content of the above publication is limited to shuttle-type apparatuses, and the realization of marginless printing is not cited.

Examples of methods used to create marginless printouts with an inkjet recording apparatus include a method in which recording images that are smaller than the recording medium are recorded, and the blank peripheral margin portion (edge portion) is cut off; and a method for recording images to a greater size that the recording medium. The former method excessively consumes ink and recording medium, and requires a mechanism that recovers and eliminates the cropped portion. The latter method has a drawback in that the peripheral portion of the image does not fit into the area of the recording medium, the medium conveyance pathway becomes sullied by the ink discharged to the area outside the recording medium, and the ink therefrom adheres to the reverse side of the recording medium.

With respect to this issue, Japanese Patent Application Publication No. 2001-96874 cites a concept for determining the area in which an image-receiving medium is present, and producing marginless printouts according to the determination results. However, Japanese Patent Application Publication No. 2001-96874 does not mention a specific image processing method for producing marginless printouts. In the same publication, the image recording area is identified by the ratio of the size of the image and the size of the recording medium, but when using a large recording medium, the absolute value (length) of the blank area increases, and a white-framed margin becomes visible.

SUMMARY OF THE INVENTION

The present invention is contrived in view of such circumstances, and an object thereof is to provide an image recording apparatus and method that can inhibit the wasteful consumption of ink, toner, and other recording materials, prevent the sullying or the like of the area outside the recording medium, and record marginless images on the recording medium.

In order to achieve the above-described object, the present invention is directed to an image recording apparatus which records images on a recording medium by performing relative movement of the recording medium and a recording head provided with image recording elements, and controlling driving of the image recording elements according to image data, the apparatus comprises: a recording medium size determination device which determines a size of the recording medium to be used; a magnification setting device which sets magnification in order to generate an image larger than the size of recording medium according to input image data and the size of the recording medium determined by the recording medium size determination device; a first image processing device which generates image data with a size larger than the size of the recording medium from the input image data in accordance with the magnification set by the magnification setting device; a recording medium determination device which is disposed further upstream from the recording head in a relative movement direction of the recording medium by the relative movement and which acquires recording medium information including shape, orientation, and position of the recording medium; a second image processing device which generates image data with a size equal to or smaller than a recording medium area indicated by the recording medium information according to the recording medium information from the image data generated by the first image processing device; and a recording control device which controls the recording head according to the image data generated by the second image processing device, and records on the recording medium the image indicated by the image data.

In accordance with the present invention, the size of the recording medium to be used is determined in the recording medium size determination device. The image data input as an object of printing is enlarged or shrunk by the first image processing device in accordance with the magnification setting of the magnification setting device, and is converted to an image (referred to as "first processing image") with a size that is larger than the size of recording medium. The recording medium determination device determines the shape, orientation, and position of the recording medium in front of (before entering the recording step) the recording head, and obtains the recording medium information indicating the area in which the recording medium is actually present.

An image is generated that is equal to or slightly smaller than the area in which the recording medium is actually present by forming the first processing image in the second image processing device according to the recording medium information determined in this manner. An editing processing such as a processing for changing the magnification of the image (enlarging/shrinking), a processing for modifying a portion of the image, a processing for rotating the image, a processing for cutting (trimming) a portion of the image, or a combination of these are included in the processing content in the second image processing device.

An image is formed in the area in which the recording medium is present through the operation of the image recording elements, by the recording control device controlling the driving of the image recording elements of the recording head according to the image data generated in the manner. In accordance with the present invention, the printing range of the image is limited in accordance with the area in which the recording medium is actually present, and image recording is performed on the recording medium alone, so the consumption of excess ink and other undesirable results can be prevented, and adequate marginless printing can be realized.

As an image recording device related to an aspect of the present invention, the second image processing device performs a trimming processing that cuts the image range from the image data generated by the first image processing device in accordance with the recording medium area indicated by the recording medium information according to the recording medium information.

Another aspect of the present invention provides a configuration wherein the magnification is set in the magnification setting device so as to allow an image to be generated that is larger than the recording medium in size without changing the aspect ratio of the image when the aspect ratio of the input image data and the aspect ratio of the recording medium are different from each other.

When the aspect ratios of the input image data (original image) and the recording medium are different, a processing for changing the magnification to provide uniform magnification in the perpendicular and lateral directions of the image is preferably performed without changing the aspect ratio of the input images to generate an image (first processing image) with a size that is larger than the size of the recording medium.

As an image recording apparatus related to yet another aspect of the present invention, the magnification setting device sets the magnification so that an image with a predetermined magnification (enlarged/shrunk) set in advance can be obtained with respect to the size of the recording medium determined by the recording medium size determination device.

When the recording medium determination device is disposed upstream from the recording head, a configuration in which these are disposed in a positional relationship that is as close as possible is advantageous in that the positional displacement of determination is small. However, in the case of a configuration in which the recording medium determination device is disposed in the upstream vicinity of the recording head, and image recording by the recording head to the recording medium is started before the entire area in which the recording medium is present is determined, magnification by the magnification setting device cannot be decided after the recording medium information is completely obtained by the recording medium determination device, using the information thus obtained. In such as configuration, it is preferable to make assumptions concerning the amount of conveyance displacement, shape errors, amount of orientation displacement, and other information, and set the magnification with the magnification setting device in advance so as to generate an image (first processing image) with a size that will sufficiently cover the assumed information.

When the configuration is one in which the recording medium determination device and the recording head are separated by a certain amount of distance and the recording head starts recording after the recording medium determination device has finished completely determining the area in which the recording medium is present, a preferable aspect is one in which the area in which the recording medium is present is completely determined and then the magnification in the magnification setting device is adaptively set using the information. In other words, as an image recording apparatus related to another aspect of the present invention, the magnification setting device sets the magnification in accordance with the recording medium information obtained by the recording medium determination device.

A suitable magnification can thereby be designated to obtain a first processing image with the smallest enlarged size required with respect to the recording medium, and the amount of image loss (amount of image range that is cut away as the non-printing area, the so-called clipped amount) during the trimming processing in the second image processing device can be held in check.

Another aspect of the present invention for achieving the above-stated object is an image recording apparatus which records images on a recording medium by performing relative movement of the recording medium and a recording bead provided with image recording elements, and controlling driving of the image recording elements according to image data, the apparatus comprising: a recording medium determination device which is disposed further upstream from the recording head in a relative movement direction of the recording medium by the relative movement and which acquires recording medium information including shape, orientation, and position of the recording medium; an image processing device which modifies an input image in accordance with a recording medium area indicated by the recording medium information according to the recording medium information, so as to generate image data with a size equal to or smaller than the recording medium area; and a recording control device which controls the recording head according to the image data generated by the image processing device, and records on the recording medium the image indicated by the image data.

In accordance with the present invention, the original image is modified in accordance with the area in which the recording medium is present, and the image is recorded within the area of the recording medium. Image modification as used herein includes modification by image rotation, and modification of a portion of the image in addition to enlarging/shrinking modification such as distorting the overall image by interpolating or otherwise manipulating the image data. In accordance with this aspect, there is no loss of image range, and the content of the entire range of the input image can be recorded in comparison with the aspect in which the printing range is limited by trimming.

In the image recording apparatus related to yet another aspect of the present invention, the recording control device performs recording control so as to form an area in which an image is not recorded with respect to the entire periphery of the recording medium within a range that extends from the edge of the recording medium inward over a distance that corresponds to n dots for which the following formula is satisfied: $Pt \times (n-1) + D < 60 \, \mu m$, where $Pt$ is the dot pitch ($\mu m$), and $D$ is the dot diameter ($\mu m$).

Experimentation shows that, regardless of the shape and size of the recording medium, a blank range that is 60 μm or less from the edge (edge face) of the recording medium is difficult to visually determine as an image border. Therefore, as shown in the above formula, deposition or the like of excess ink in the area outside the recording medium can reliably be prevented by not recording images on the periphery of the recording medium in a range that cannot be visually determined (in other words, by leaving a blank that is n dots from the edge of the recording medium, and recording images solely inside the area in which the recording medium is present).

Another aspect of the present invention provides a configuration wherein the recording head is a full-line recording head in which a plurality of image recording elements are arranged across a length corresponding to the entire width of the recording medium.

In accordance with this aspect, image recording elements are driven as the recording medium is moved in the sub-scanning direction in relation to a full-line recording head having rows of image recording elements with a length that corresponds to the entire width of the recording medium in the direction (main scanning direction) that is substantially perpendicular to the relative feed direction (sub-scanning direction) of the recording medium, to form an image on the recording medium.

In the case of an inkjet recording apparatus in which nozzles for discharging ink are adopted as the image recording elements, an image is formed on the recording medium by controlling the ink discharge timing of the recording head and the relative conveyance of the recording medium.

A "full-line recording head" is normally disposed along the direction perpendicular to the relative feed direction (direction of relative movement) of the recording medium, but also possible is an aspect in which the recording head is disposed along the diagonal direction given a predetermined angle with respect to the direction perpendicular to the direction of relative movement. The array form of the image-recording elements in the recording head is not limited to a single row array in a line, but a matrix array composed of a plurality of rows is also possible. Furthermore, also possible is an aspect in which a plurality of short-length recording head units having a row of image-recording elements that do not have lengths that correspond to the entire width of the recording medium are combined and the image-recording element rows are configured so as to correspond to the entire width of the recording medium, with these units acting as a whole.

The "recording medium" is a medium (an object that may be referred to as a recording medium, image formation medium, recording medium, image receiving medium, or the like) that receives the printing through the action of the recording head, and includes continuous paper, cut paper, seal paper, OHP sheets, and other resin sheets, as well as film, cloth, and various other media without regard to materials or shapes. In the present specification, the term "printing" expresses the concept of not only the formation of characters, but also the formation of images with a broad meaning that includes characters.

The movement device (conveyance device) for moving the recording medium and recording head in relation to each other includes an aspect in which the recording medium is conveyed with respect to a stationary (fixed) recording head, an aspect in which the recording head is moved with respect to a stationary recording medium, or an aspect in which both the recording head and the recording medium are moved.

As yet another aspect of the present invention, the recording medium determination device is a line CCD sensor having a structure in which a plurality of image reading elements are arranged in a line, and the read resolution is optimally set to a level of about double the resolution (850 dpi) or greater and equal to or less than the recording density of the recording head so as to be able to determine the 60 µm border described above. The line CCD sensor is disposed substantially parallel to the recording head. Selecting a black color for the conveyance guide facing the line CCD sensor is effective in improving the read accuracy of the recording information.

In accordance with an aspect in which the line CCD sensor is disposed substantially parallel to the recording head in the upstream side vicinity of a long recording head, a marginless printout with a very small amount of recording displacement can be created with respect to the recording medium area by performing image-recording action in synchronization with the orientation, shape, and position of the recording medium determined by the line CCD sensor.

Another aspect of the present invention provides a method for achieving the above-stated object. In other words, the present invention is also directed to an image recording method which records images on a recording medium by performing relative movement of the recording medium and a recording head provided with image recording elements, and controlling driving of the image recording elements according to image data, the method comprising: a recording medium size determination step which determines a size of the recording medium to be used; a magnification setting step which sets magnification in order to generate an image larger than the size of recording medium according to input image data and the size of the recording medium determined by the recording medium size determination step; a first image processing step which generates image data with a size larger than the size of the recording medium from the input image data in accordance with the magnification set by the magnification setting step; a recording medium determination step which uses a recording medium determination device disposed further upstream from the recording head in a relative movement direction of the recording medium by the relative movement and which acquires recording medium information including shape, orientation, and position of the recording medium; a second image processing step which generates image data with a size equal to or smaller than a recording medium area indicated by the recording medium information according to the recording medium information from the image data generated by the first image processing step; and a recording control step which controls the recording head according to the image data generated by the second image processing step, and records on the recording medium the image indicated by the image data.

Yet another aspect of the present invention is an image recording method which records images on a recording medium by performing relative movement of the recording medium and a recording head provided with image recording elements, and controlling driving of the image recording elements according to image data, the method comprising: a recording medium determination step which uses a recording medium determination device disposed further upstream from the recording head in a relative movement direction of the recording medium by the relative movement and which acquires recording medium information including shape, orientation, and position of the recording medium; an image processing step which modifies an input image in accordance with a recording medium area indicated by the recording medium information according to the recording medium information, so as to generate image data with a size equal to or smaller than the recording medium area; and a recording control step which controls the recording head according to the image data generated by the image processing step, and records on the recording medium the image indicated by the image data.

In accordance with the present invention, the configuration is such that the state (shape, orientation, position) of the recording medium is determined by the recording medium determination means disposed on the upstream side of the recording head, the image is processed to generate image data for printing in accordance with the area in which the recording medium is present according to the determined recording medium information, and the driving of the image recording device in the recording head and the recording medium that is relatively conveyed is controlled based on the image data obtained by image processing, so an image (marginless image) that fits the recording medium area can be recorded in the recording medium area alone.

In aspects in which the present invention is applied to an image recording apparatus that uses an inkjet recording head provided with nozzles for discharging ink, which is an aspect of image recording elements, ink is not discharged to areas outside the recording medium, so the wasteful consumption of ink can be held in check, and the drawback in which ink deposits on the medium conveyance pathway, the reverse side of the recording medium, and other areas is solved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3C is a perspective plan view showing another example of the configuration of the print head;

FIG. 15 is a diagram showing an example of the conditions for specifying the range of the non-recording area in the margin portion of the recording medium.

DETAILED DESCRIPTION OF THE PREFERRED EMBODIMENTS

General Configuration of an Inkjet Recording Apparatus

Figure 1:
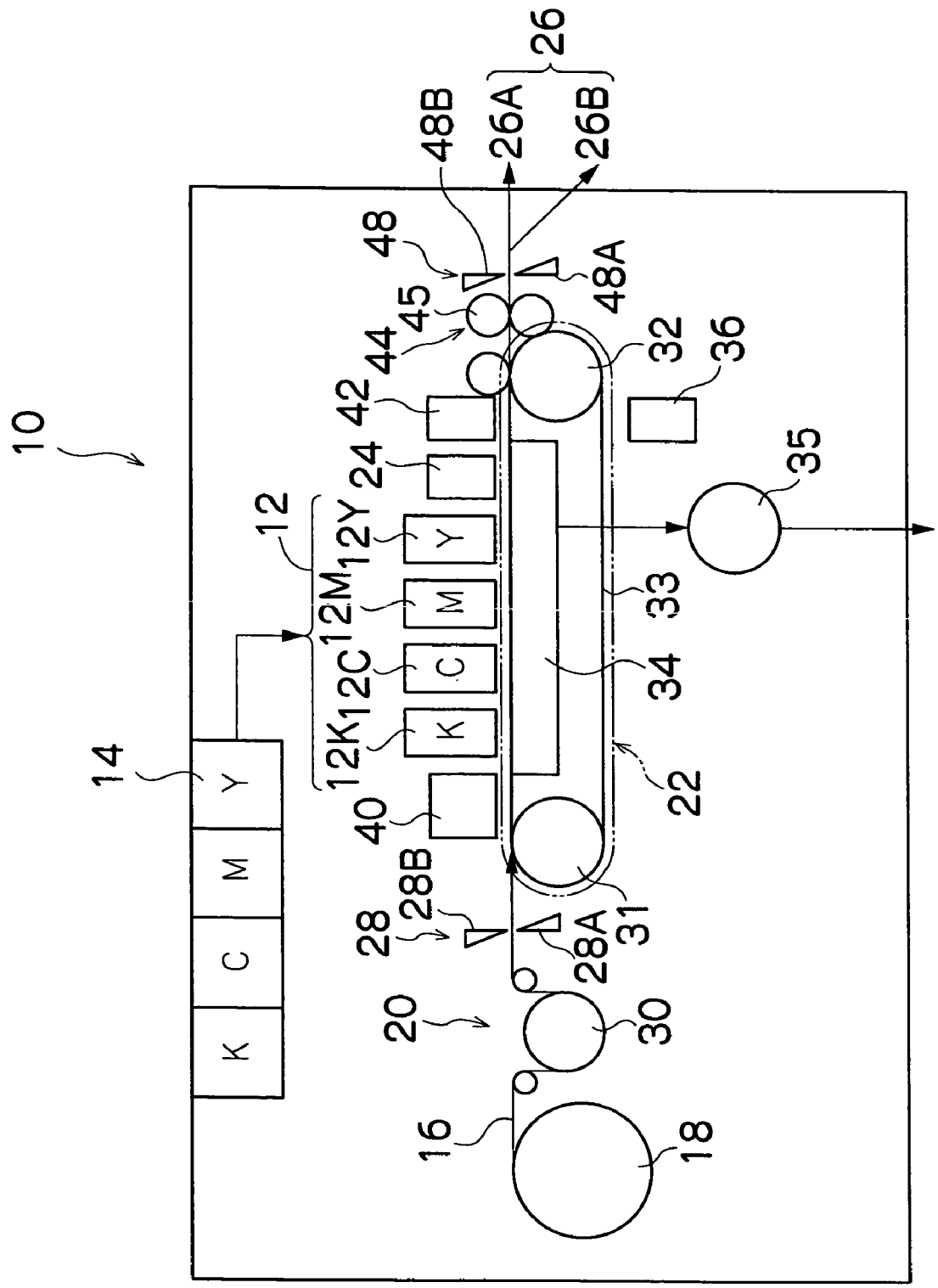
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a line CCD sensor 21 for determining the shape, orientation, and position of the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that a information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction. The belt 33 is driven in the clockwise direction in FIG. 1 by the motive force of a motor (not shown in FIG. 1, but shown as a motor 88 in FIG. 6) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

The line CCD sensor 21 and a heating fan 40 is disposed on the upstream side of the printing unit 12 in the conveyance pathway formed by the suction belt conveyance unit 22. The line CCD sensor 21 has a row of photoelectric transducing elements (sensor pixels) arranged in a line along the widthwise direction of the recording paper 16 and longer than the entire width of the recording paper 16, and outputs information (a presence signal of the recording medium) showing the shape, orientation, and position of the recording paper 16 by capturing images of the conveyed recording paper 16.

The heating fan 40 blows heated air onto the recording paper 16 to heat the recording paper 16 immediately before printing so that the ink deposited on the recording paper 16 dries more easily.

Figure 2:
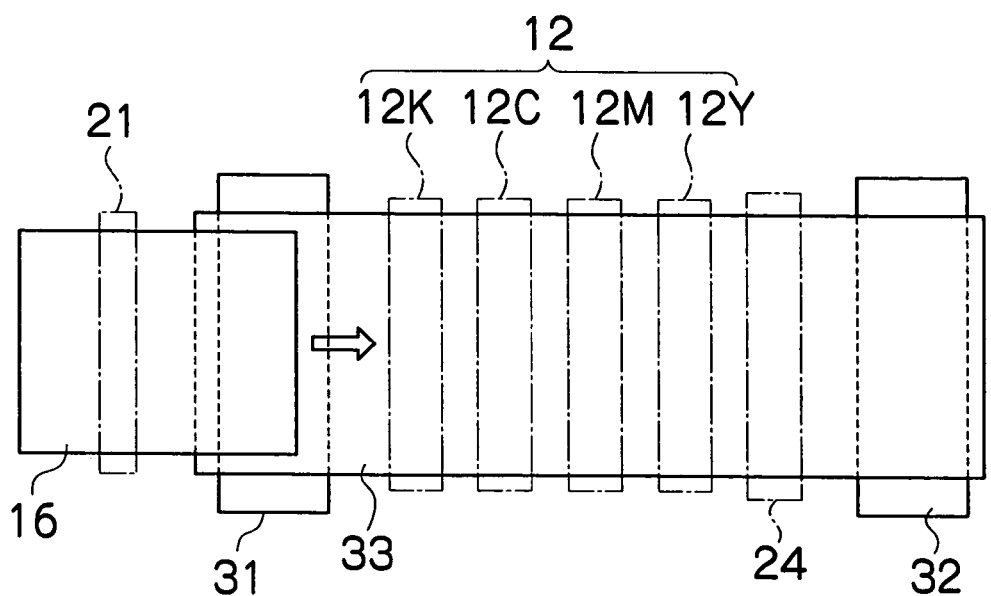
FIG. 2 is a plan view of principal components of an area around a printing unit of the inkjet recording apparatus in FIG. 1.

As shown in FIG. 2, the printing unit 12 forms a so-called full-line head in which a line head having a length that corresponds to the maximum paper width is disposed in the main scanning direction perpendicular to the delivering direction of the recording paper 16 (hereinafter referred to as the paper conveyance direction) represented by the arrow in FIG. 2, which is substantially perpendicular to a width direction of the recording paper 16. A specific structural example is described later with reference to FIGS. 3A to 5. Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in this order from the upstream side along the paper conveyance direction. A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, a sorter for collecting prints according to print orders is provided to the paper output unit 26A for the target prints.

Next, the structure of the print heads is described. The print heads 12K, 12C, 12M, and 12Y provided for the ink colors have the same structure, and a reference numeral 50 is hereinafter designated to any of the print heads 12K, 12C, 12M, and 12Y.

Figure 3A:
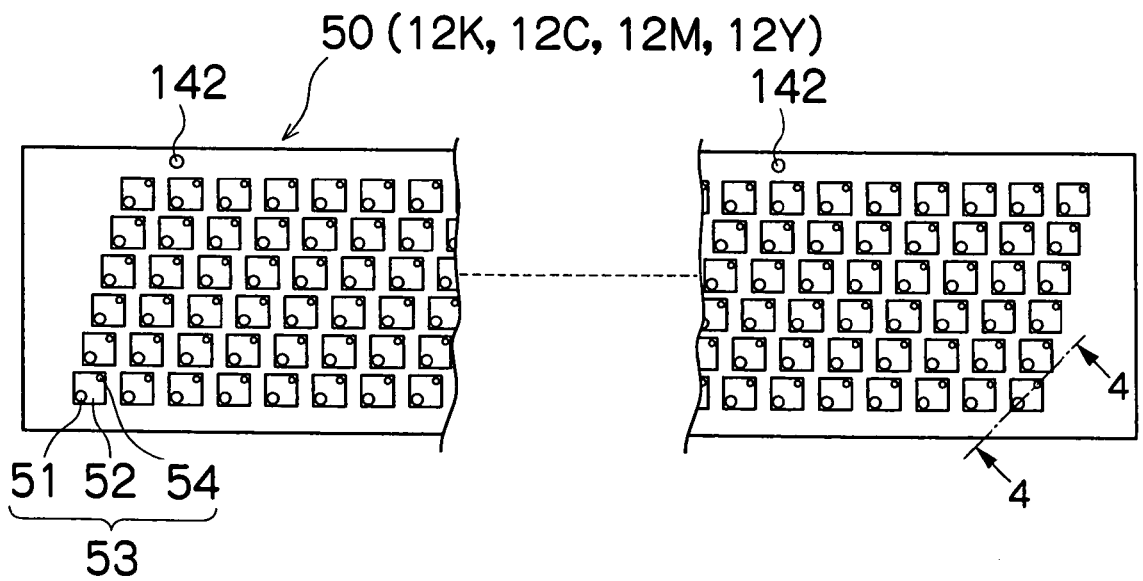
FIG. 3A is a perspective plan view showing an example of a configuration of a print head.
Figure 3B:
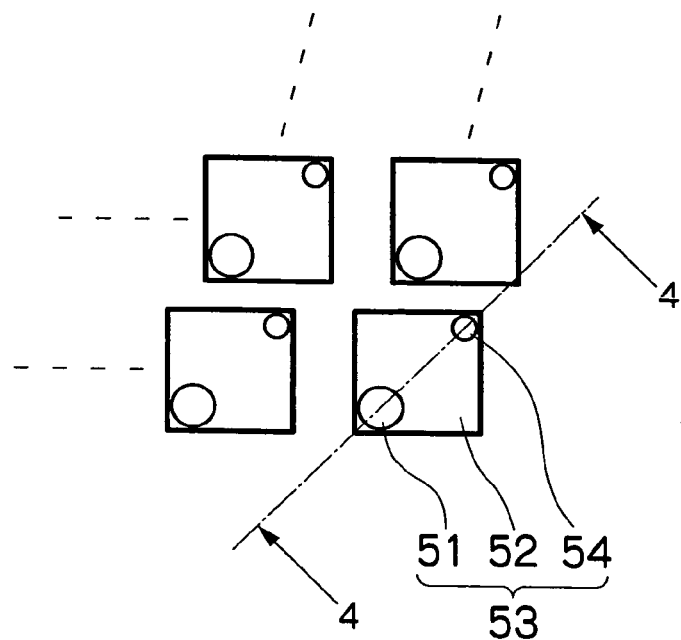
FIG. 3B is a partial enlarged view of FIG. 3A.
Figure 4:
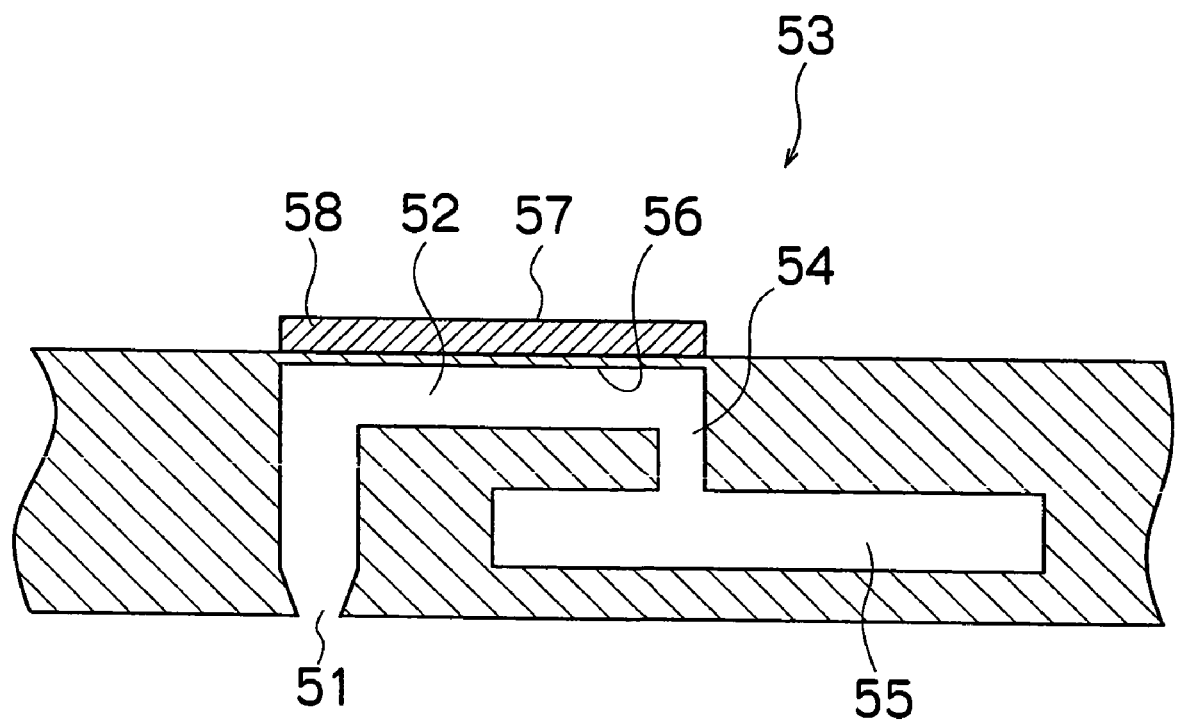
FIG. 4 is a cross-sectional view along a line 4—4 in FIGS. 3A and 3B.

FIG. 3A is a perspective plan view showing an example of the configuration of the print head 50, FIG. 3B is an enlarged view of a portion thereof, FIG. 3C is a perspective plan view showing another example of the configuration of the print head, and FIG. 4 is a cross-sectional view taken along the line 4—4 in FIGS. 3A and 3B, showing the inner structure of an ink chamber unit.

The nozzle pitch in the print head 50 should be minimized in order to maximize the density of the dots printed on the surface of the recording paper. As shown in FIGS. 3A, 3B, 3C and 4, the print head 50 in the present embodiment has a structure in which a plurality of ink chamber units 53 including nozzles 51 for ejecting ink-droplets and pressure chambers 52 connecting to the nozzles 51 are disposed in the form of a staggered matrix, and the effective nozzle pitch is thereby made small.

Thus, the print head 50 in the present embodiment is a full-line head in which one or more of nozzle rows in which the ink discharging nozzles 51 are arranged along a length corresponding to the entire width of the recording paper 16 in the direction substantially perpendicular to the conveyance direction of the recording paper 16.

Alternatively, as shown in FIG. 3C, a full-line head can be composed of a plurality of short-length head units 50' arranged in the form of a staggered matrix and combined so as to form nozzle rows having lengths that correspond to the entire width of the recording paper 16.

The planar shape of the pressure chamber 52 provided for each nozzle 51 is substantially a square, and the nozzle 51 and an inlet of supplied ink (supply port) 54 are disposed in both corners on a diagonal line of the square. As shown in FIG. 4, each pressure chamber 52 is connected to a common channel 55 through the supply port 54. The common channel 55 is connected to an ink supply tank, which is a base tank that supplies ink, and the ink supplied from the ink tank is delivered through the common flow channel 55 to the pressure chamber 52. It is preferable to provide a sub-tank (not shown) between the ink tank and the common flow channel 55 nearby the print head 12 or integrally to the print head 12. The sub-tank has a damper function for preventing variation in the internal pressure of the head and a function for improving refilling of the print head.

An actuator 58 having a discrete electrode 57 is joined to a pressure plate 56, which forms the ceiling of the pressure chamber 52, and the actuator 58 is deformed by applying drive voltage to the discrete electrode 57 to eject ink from the nozzle 51. When ink is ejected, new ink is delivered from the common flow channel 55 through the supply port 54 to the pressure chamber 52.

Figure 5:
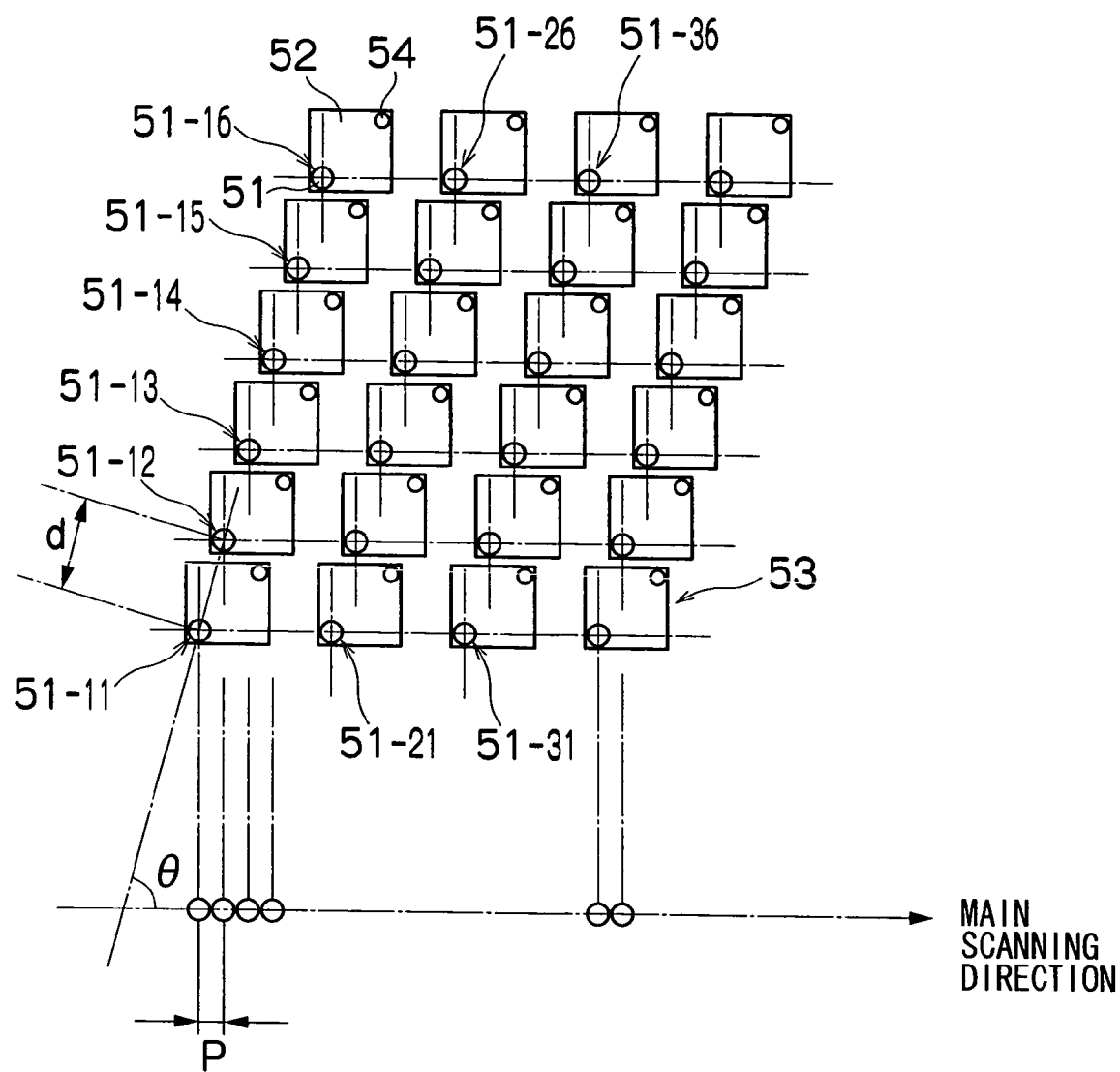
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle $\theta$ that is not a right angle with the main scanning direction, as shown in FIG. 5. With the structure in which the plurality of rows of ink chamber units 53 are arranged at a fixed pitch d in the direction at the angle $\theta$ with respect to the main scanning direction, the nozzle pitch P as projected in the main scanning direction is $d \times \cos \theta$.

Hence, the nozzles 51 can be regarded to be equivalent to those arranged at a fixed pitch P on a straight line along the main scanning direction. Such configuration results in a nozzle structure in which the nozzle row projected in the main scanning direction has a high density of up to 2,400 nozzles per inch. For convenience in description, the structure is described below as one in which the nozzles 51 are arranged at regular intervals (pitch P) in a straight line along the lengthwise direction of the head 50, which is parallel with the main scanning direction.

In a full-line head comprising rows of nozzles that have a length corresponding to the maximum recordable width, the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, ..., 51-36 are treated as another block, ...); and one line is printed in the width direction of the recording paper 16 by sequentially driving the nozzles 51-11, 51-12, ..., 51-16 in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

In the implementation of the present invention, the structure of the nozzle arrangement is not particularly limited to the examples shown in the drawings. Moreover, the present embodiment adopts the structure that ejects ink-droplets by deforming the actuator 58 such as a piezoelectric element; however, the implementation of the present invention is not particularly limited to this. Instead of the piezoelectric inkjet method, various methods may be adopted including a thermal inkjet method in which ink is heated by a heater or another heat source to generate bubbles, and ink-droplets are ejected by the pressure thereof.

Figure 6:
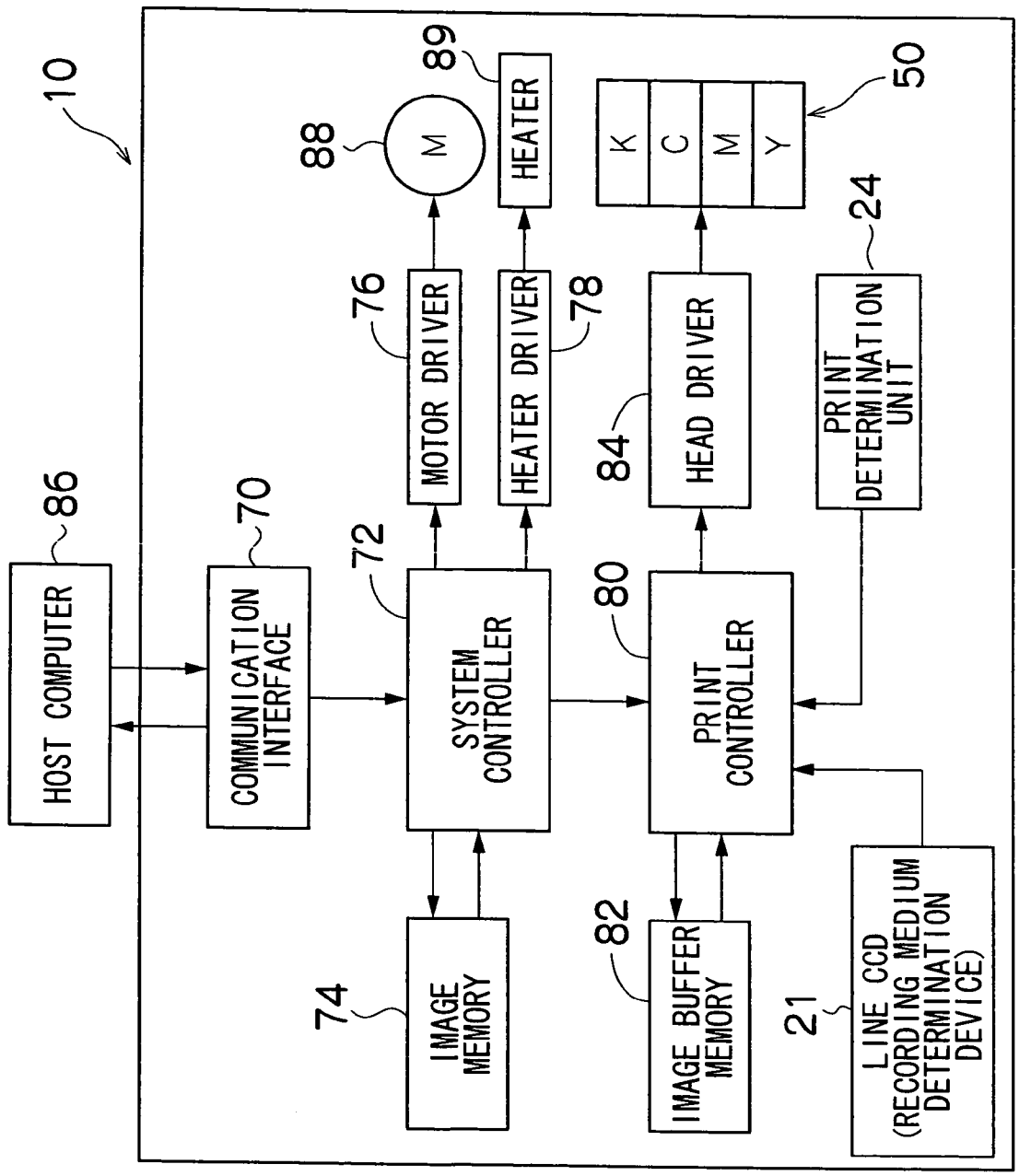
FIG. 6 is a block diagram of principal components showing a system configuration of the inkjet recording apparatus.

FIG. 6 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (print data) to the head driver 84.

The print controller 80 adjusts image data as required to the conditions of the recording paper 16 according to the determination results of the recording paper 16 obtained by the line CCD sensor 21.

Required signal processing is performed in the print controller 80, and the ejection timing and ejection amount of the ink-droplets from the print head 50 are controlled by the head driver 84 according to the image data. Desired dot sizes and dot placement can be brought about thereby.

The print controller 80 is provided with the image buffer memory 82; and image data, parameters, and other data are temporarily stored in the image buffer memory 82 when image data is processed in the print controller 80. The aspect shown in FIG. 6 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 12K, 12C, 12M, and 12Y of the respective colors according to the print data received from the print controller 80. A feedback control system for keeping the drive conditions for the print heads constant may be included in the head driver 84.

The print determination unit 24 is a block that includes the line sensor as described above with reference to FIG. 1, reads the image printed on the recording paper 16, determines the print conditions (presence of the ejection, variation in the dot deposition, and the like) by performing desired signal processing, or the like, and provides the determination results of the print conditions to the print controller 80.

The print controller 80 makes various compensation with respect to the print head 50 as required according to the information obtained by the print determination unit 24.

First Embodiment of Controlling Operation

Figure 7:
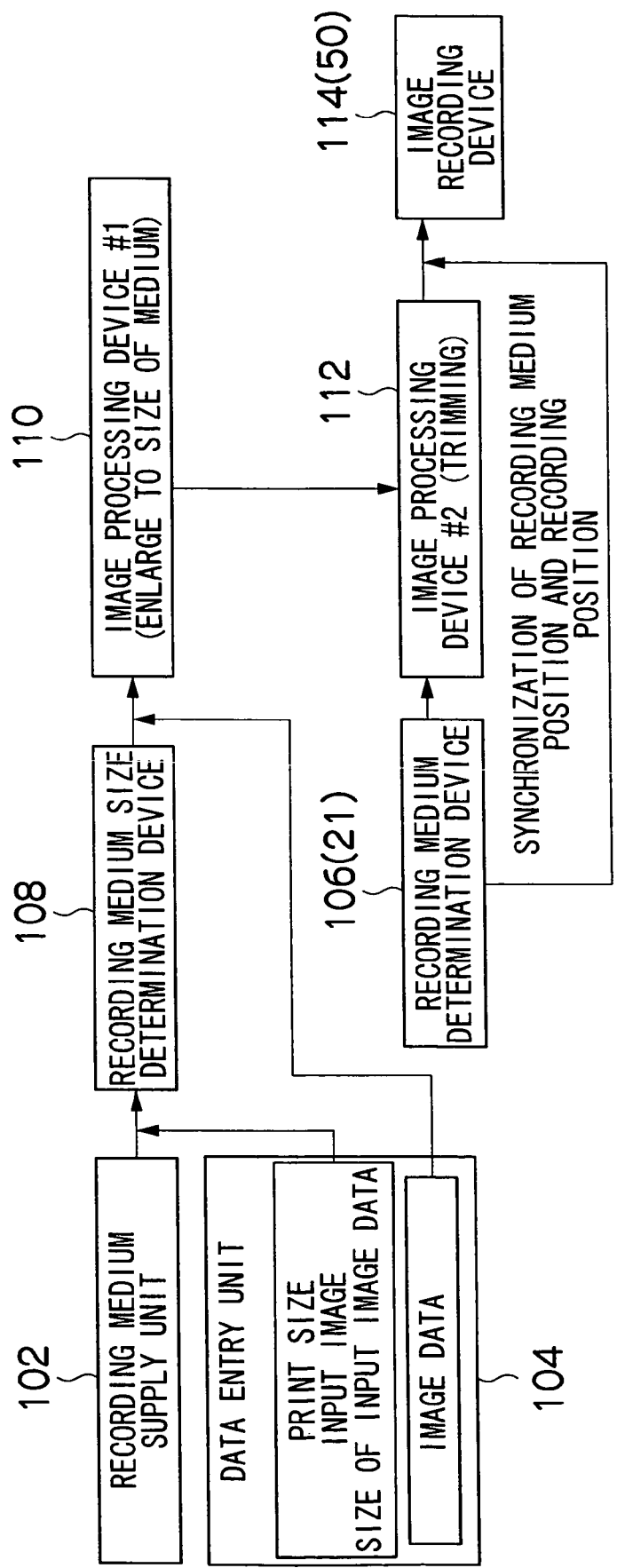
FIG. 7 is a block diagram showing a partial configuration for realizing the first embodiment of controlling operation.

FIG. 7 is a block diagram showing a partial configuration for realizing the first embodiment of controlling operation. Briefly describing the correspondence relationship between the configuration shown in FIG. 7 and FIGS. 1 to 6, the recording medium supply unit 102 in FIG. 7 is a block that includes a paper supply unit 18 composed of a magazine or the like of recording paper 16 described in FIG. 1, and a paper supply delivery mechanism thereof. The data input unit 104 in FIG. 7 is a processing block for generating image signals that correspond to the printout (image record) from the image data acquired by way of the communication interface 70. The recording medium determination device 106 is a block containing the line CCD sensor 21 described in FIG. 1, the drive circuit thereof, and other components. The recording medium size determination device 108, first image processing device 110, and second image processing device 112 in FIG. 7 are implemented in the form of a signal processing unit that includes the system controller 72, the print controller 80, or a combination of these, described in FIG. 6. The image recording device 114 in FIG. 7 is a block that includes the print unit 12 with the print head 50, the head driver 84, and the drive control system for the suction belt conveyance unit 22.

The information indicating the specifics (paper type, shape, size, and other information) of at least one type (preferably a plurality of types) of recording medium disposed inside the apparatus is presented to the recording medium size determination device 108, as shown in FIG. 7. The recording medium size determination device 108 acquires the size information from the input image data by way of the data input unit 104, the designated printout size (designated output size), and other information. The recording medium size determination device 108 determines the size of the recording medium selected as the one to be used for the actual printout according to the information. That is, it is determined that the paper is A4 size (JIS standard: 297×210 mm), for example.

The information about the size of the recording medium determined by the recording medium size determination device 108 is sent to the first image processing device 110. The first image processing device 110 performs an enlarging processing whereby the original image is enlarged with uniform magnification in the perpendicular and lateral directions in order to generate an image whose size is about several percent (2 to 5%, for example) greater than the recording medium size determined for the image data acquired via the data input unit 104. The image data processed for enlargement in the first image processing device 110 is sent to the second image processing device 112.

The second image processing device 112 is a device (a device for trimming, enlarging/shrinking, image rotation, image modification, and other types of manipulation, for example) that further processes an enlarged image obtained by the first image processing device 110, and performs image processing that generates an image whose size is equal to or slightly smaller than the recording area of the determined recording medium according to the signal showing the shape, orientation, and position of the recording medium determined by the recording medium determination device 106.

Thus, the image data generated by the second image processing device 112 is sent to the image recording device 114 and is recorded to the recording medium by the image recording device 114. The recording medium position and the recording position are synchronized and recording is performed according to the signal obtained by the recording medium determining device 106 during image recording.

Figure 8:
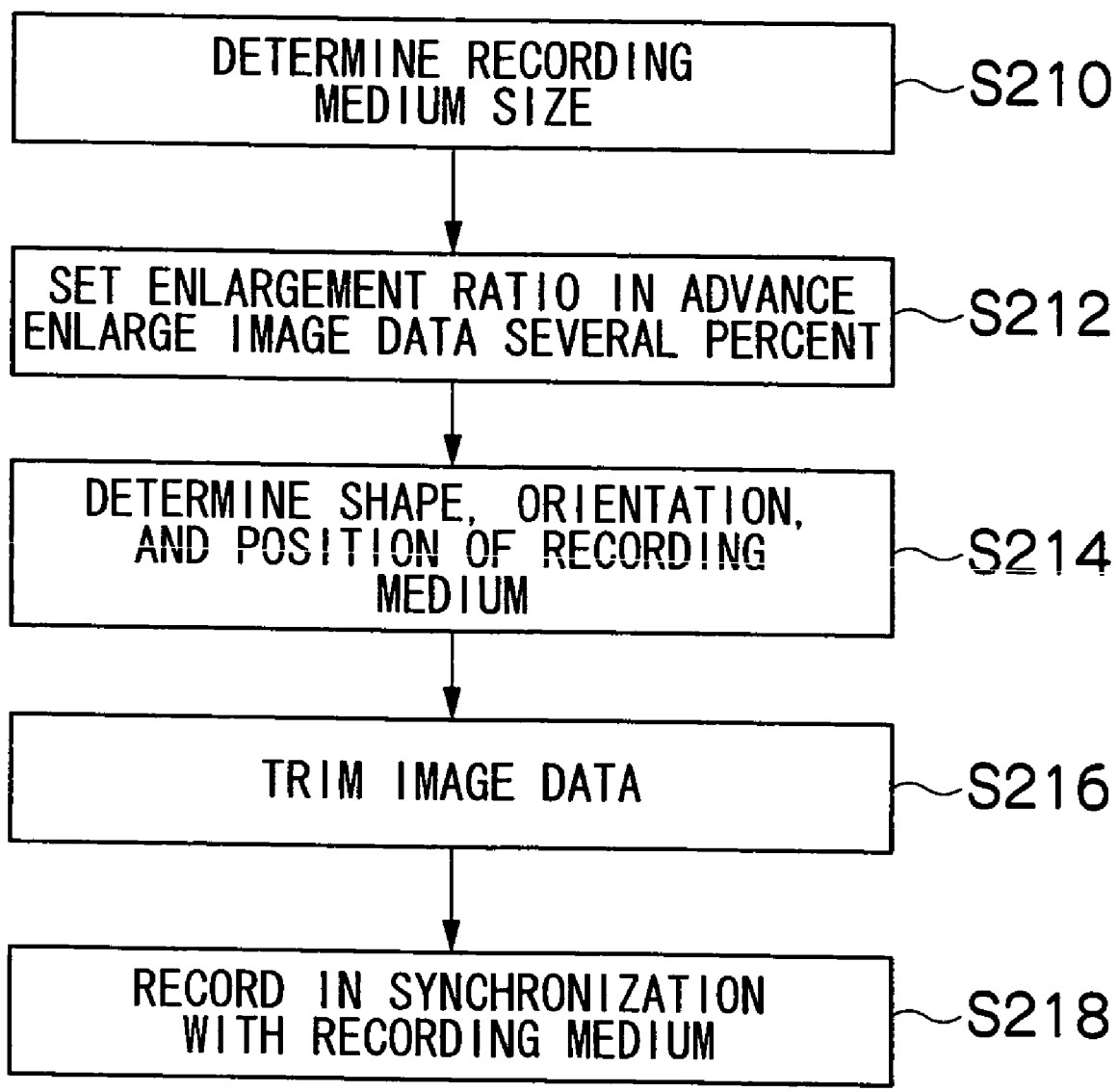
FIG. 8 is a flowchart showing the operation of the configuration shown in FIG. 7.
Figure 9A:
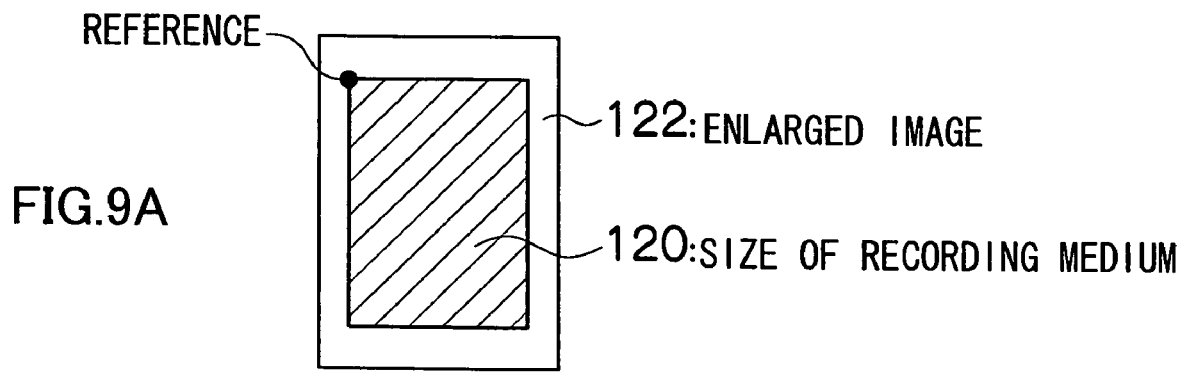
FIGS. 9A to 9D are diagrams for describing the content of the processing shown in FIG. 8.

FIG. 8 is a flowchart showing the operation of the configuration shown in FIG. 7. First, the size of the recording medium is determined (step S210), as shown in FIG. 8, and the image data is enlarged several percent with respect to the size of the recording medium in accordance with the enlargement ratio (several percent enlargement, for example) set in advance (step S212). Conceptual diagrams thereof are shown in FIGS. 9A to 9D. The image data (enlarged image data) 122 that is large overall (the size to which the margin area cut off by trimming is added) with respect to the determined recording medium size 120 is generated, as shown in FIG. 9A.

At this time, the reference point used for alignment during trimming is set inside the enlarged image data 122. Shown in FIGS. 9A to 9D is an example of the left corner of the leading edge of the recording medium 124 as the reference point, but the method of setting the reference point is not limited to this example. The right corner of the leading edge of the recording medium 124 may also serve as the reference point, as may the center point of the leading edge of the recording medium 124.

Figure 9B:
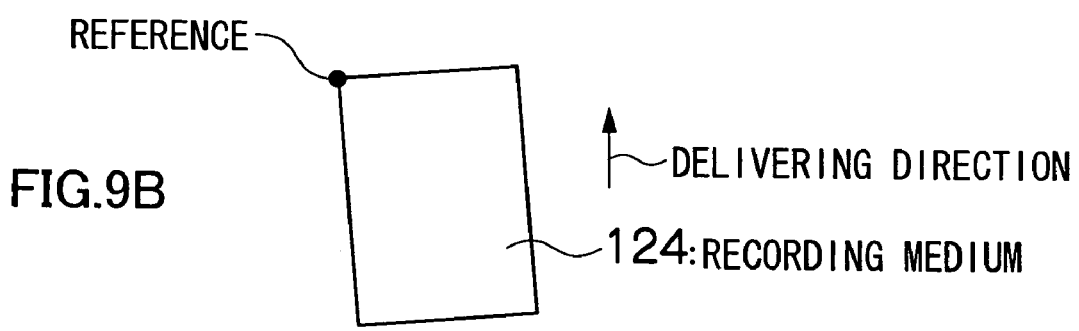

Next, the process advances to step S214 in FIG. 8, and the shape, orientation, and position of the recording medium 124 are determined by the line CCD sensor 21. Data indicating the area in which the recording medium 124 is present can be obtained as shown in FIG. 9B, for example.

Figure 9C:
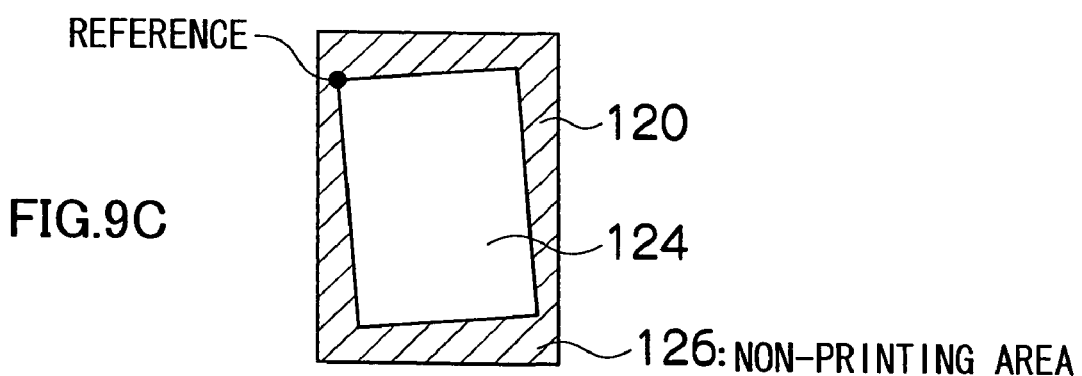

Next, the process advances to step S216 in FIG. 8, and the image data is trimmed. Here, as shown in FIG. 9C, the reference points for the enlarged image data 122 and the determined recording medium 124 are aligned and overlaid, the range equal to the area in which the recording medium 124 is present or an image range with a smaller size than this is set as the image range for printing, and enlarged image data is cut from the enlarged image data 122. In other words, the peripheral area 126 shown by the diagonal lines in FIG. 9C is the non-printing area.

Figure 9D:
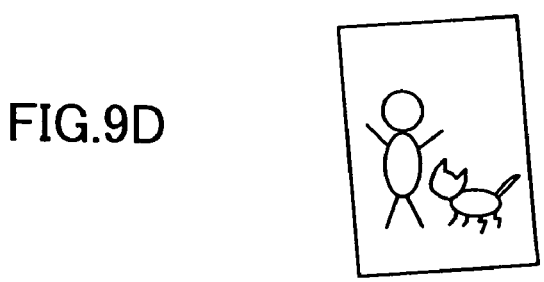

Thus, the image can be recorded to the entire print surface of the recording medium 124, as shown in FIG. 9D, by recording the cut image data for printing in synchronization with the conveyance of the recording medium 124 (step S218 of FIG. 8).

Figure 10:
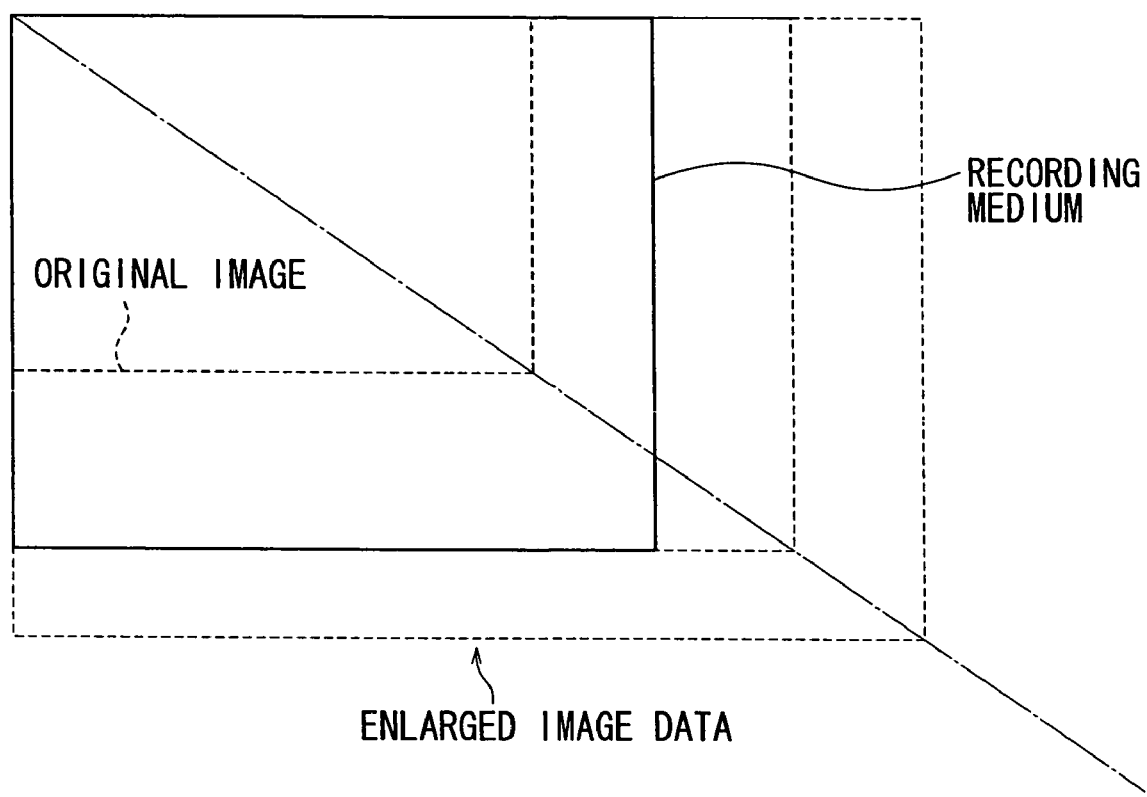
FIG. 10 is a diagram for describing the processing performed when the aspect ratio of original image and the recording medium is different.

The magnification change processing of the image data described in step S212 is performed such that a suitable magnification is preferably set so that the area of the image after the magnification change processing is larger overall than the area of the recording medium, taking into account the aspect ratios of the original image (input image) and the recording medium, as shown in FIG. 10. In other words, when the aspect ratios of the original image and the recording medium are different, the magnification to achieve the corresponding enlargement (or shrinkage) without changing the aspect ratio of the image is determined so that the long side of the image as a reference is equal to or greater than the long side of the recording medium, as shown in FIG. 10.

Figure 11:
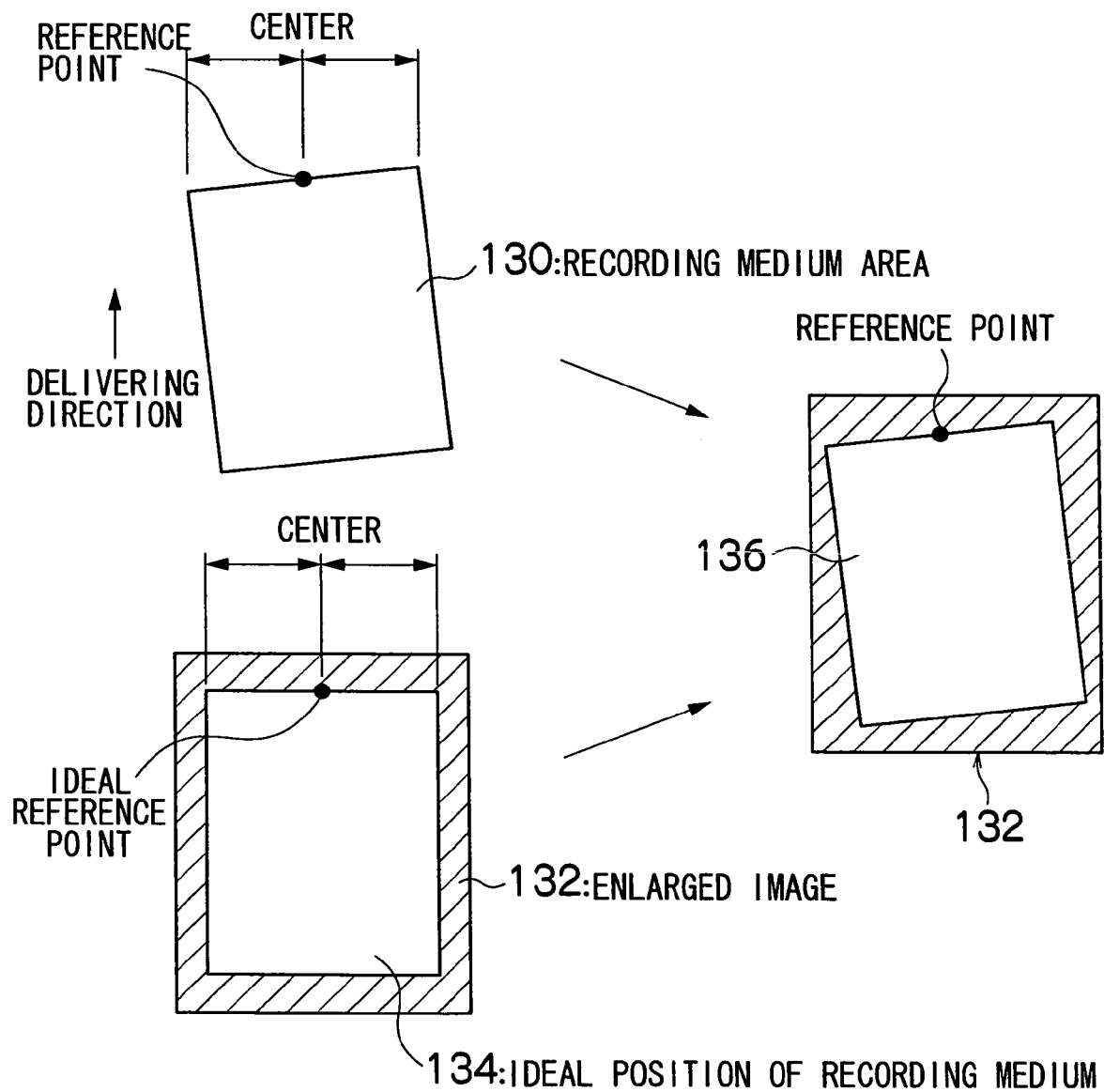
FIG. 11 is a diagram showing an example for setting the reference point during trimming.

In FIGS. 9A to 9D, the recording medium is positioned using the left corner of the leading edge of the medium as the reference, but also possible is an aspect in which the center of the leading edge of the recording medium area 130 determined by the line CCD sensor 21 is set as the reference point, and the ideal reference point indicating the ideal position of the center of the leading edge in the image 132 that has been enlarged (enlarged image) is overlaid (in other words, the center of the leading edge of the recording medium when the ideal position 134 of the recording medium is overlaid on the enlarged image 132) to perform trimming, as shown in FIG. 11. In this case, the center of the leading edge of the recording medium area 130 determined by the line CCD sensor 21 is set as the reference point, and the recording position (dot placement position) and the position of the recording medium in the trimmed image 136 are synchronized to perform image recording by controlling ink discharge.

The above-described first embodiment of controlling operation is applied to a configuration in which the line CCD sensor 21 as the recording medium determination device 106 is disposed upstream and in the vicinity of the print head 50, the image is trimmed based on the presence signal obtained by the recording medium determination device 106 from the enlarged image generated by the first image processing device 110, and the trimmed image is recorded to the recording medium.

In this first embodiment of controlling operation, the distance between the line CCD sensor 21 and the print head 50 is short, so there is an advantage in that there is little displacement between the determination signal of the line CCD sensor 21 and the actual state of the recording medium at the position of the print head 50. However, in the first embodiment of controlling operation, displacement and errors related to the shape, orientation, position, and other attributes of the recording medium must be estimated in advance and the original image data be enlarged in accordance with the predetermined magnification so as to make the margin area comparatively large for trimming, and the non-printing area (so-called clipped image range) becomes larger because a processing is performed based on this enlarged image data for cutting an image range that is equivalent to the range of shapes, orientations, and other attributes possessed by the actual recording medium involved in the determination.

In view of the above, the non-printing area is reduced in the second embodiment of controlling operation described below.

Second Embodiment of Controlling Operation

Figure 12:
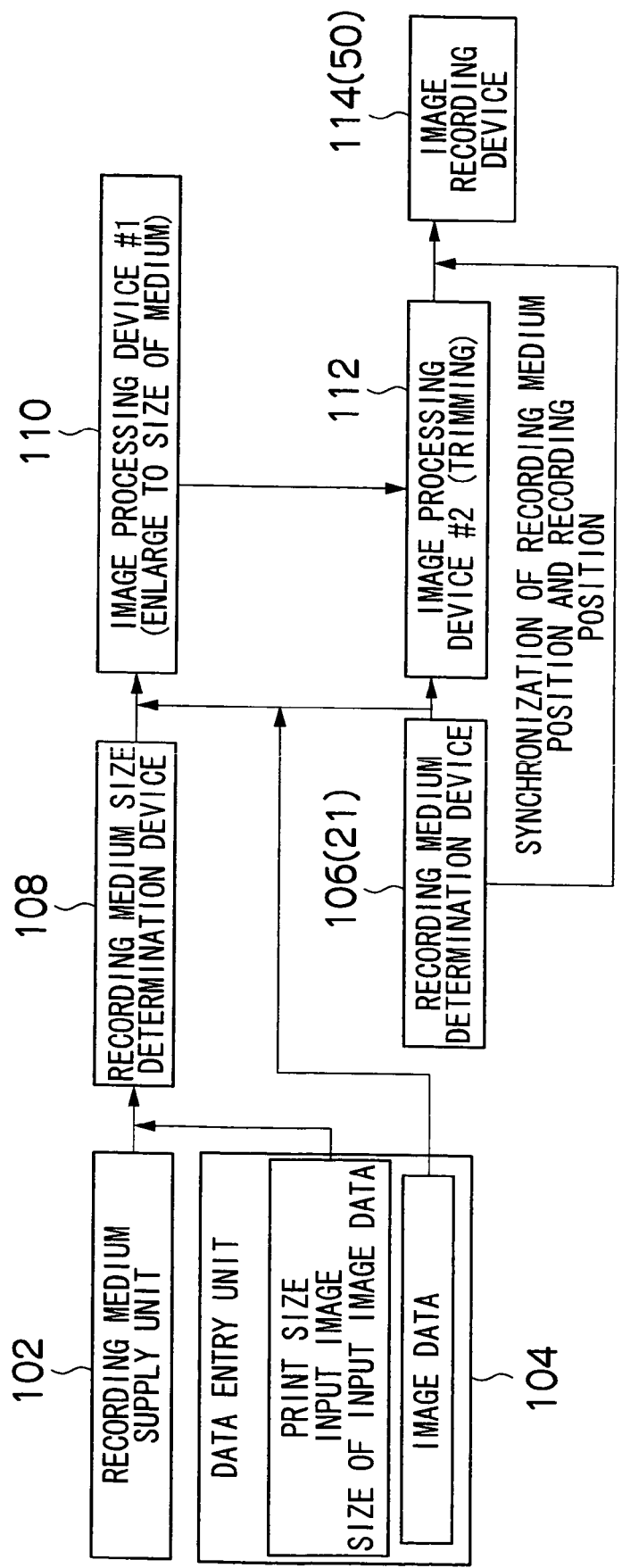
FIG. 12 is a block diagram showing a partial configuration for realizing the second embodiment of controlling operation.
Figure 13:
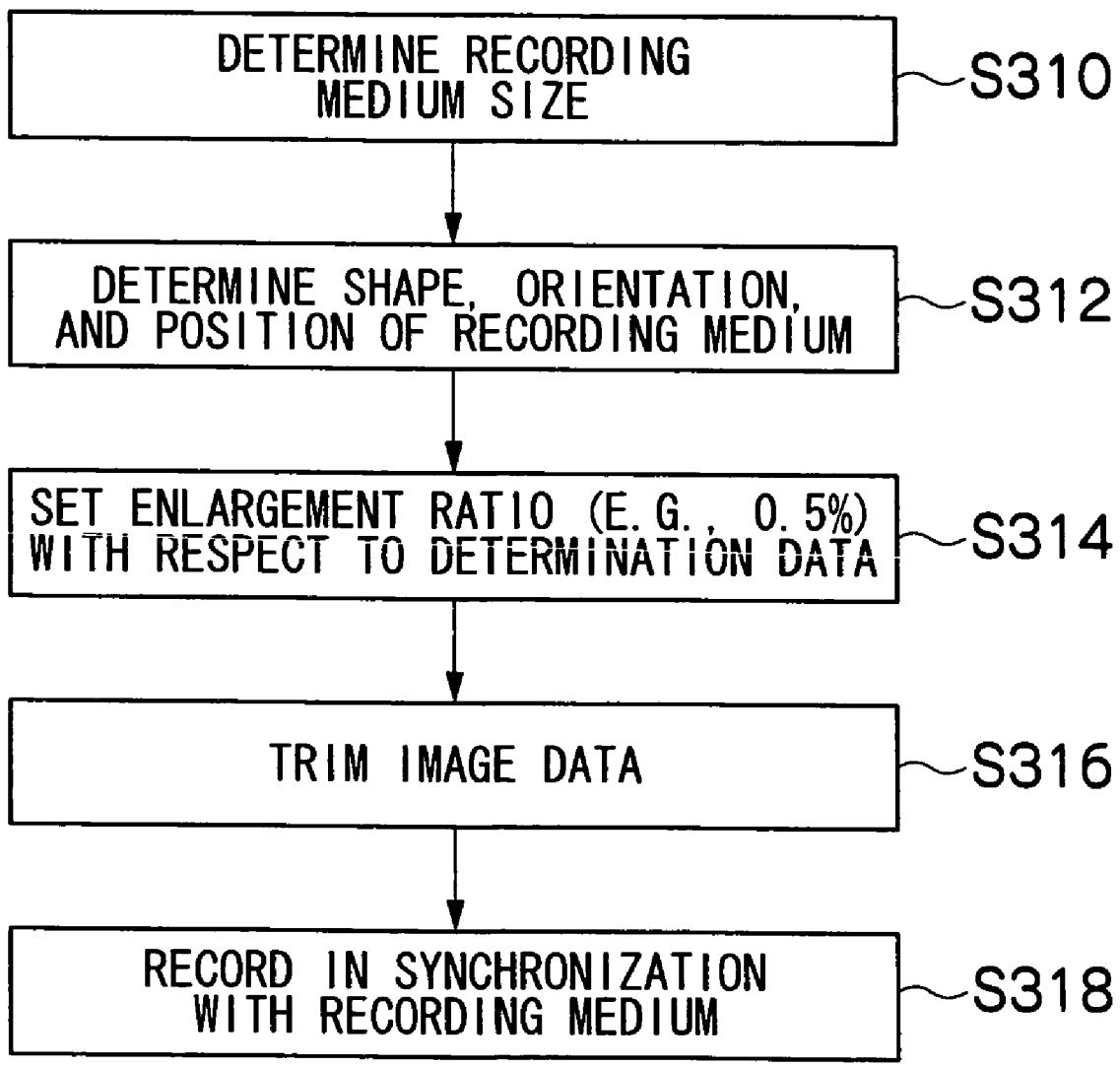
FIG. 13 is the flowchart showing the operation of the configuration shown in FIG. 12.

FIG. 12 is a block diagram showing a partial configuration for realizing the second embodiment of controlling operation, and FIG. 13 is a flowchart showing the operation thereof. In FIG. 12, the same symbols are assigned to the same or similar portions as FIG. 7, and description thereof is omitted.

In the embodiment shown in FIG. 12, the arrangement is one in which the recording medium determination device 106 is disposed on the upstream side of the print head 50 of the image recording device 114, and recording action by the print head 50 is started after the recording medium presence signal is completely obtained by the recording medium determination device 106.

As shown in FIGS. 12 and 13, the size of recording medium to be used is determined by the recording medium size determination device 108 (step S310), and the actual state (shape, orientation, and position) of the recording medium conveyed from the recording medium supply unit 102 is thereafter determined by the recording medium determination device 106 (step S312). Once the determination signal indicating the area in which the recording medium is present is completely obtained, the enlargement ratio is set for the enlarging/shrinking processing performed in the first image processing device 110 according to the determination results. The magnification is set so that an image is generated that is 0.5% larger than the determination data indicating the area in which the recording medium is present, for example (step S314).

An enlarged image is generated in the first image processing device 110 in accordance with the magnification thus set, and the image is trimmed in the second image processing device 112 according to the enlarged image (step S316). Image trimming in this case is carried out with the image center as the reference. Thus, the ink discharge timing of the print head 50 is controlled in synchronization with the conveyance of the recording medium according to image data that is cut from the enlarged image, and the trimmed image is recorded onto the recording medium (step S318). The image may also be rotated in accordance with the results of the recording medium determination device 106.

As described in the second embodiment of controlling operation above, the area in which the recording medium is present on the upstream side of the print head 50 is completely determined, and the enlargement ratio of the original image is thereafter set in accordance with the determination data, so there are advantages in that the magnification can be set so that the non-printing area has the minimum required size, and the loss of image data during recording is small.

Other Preferred Embodiments

Figure 14:
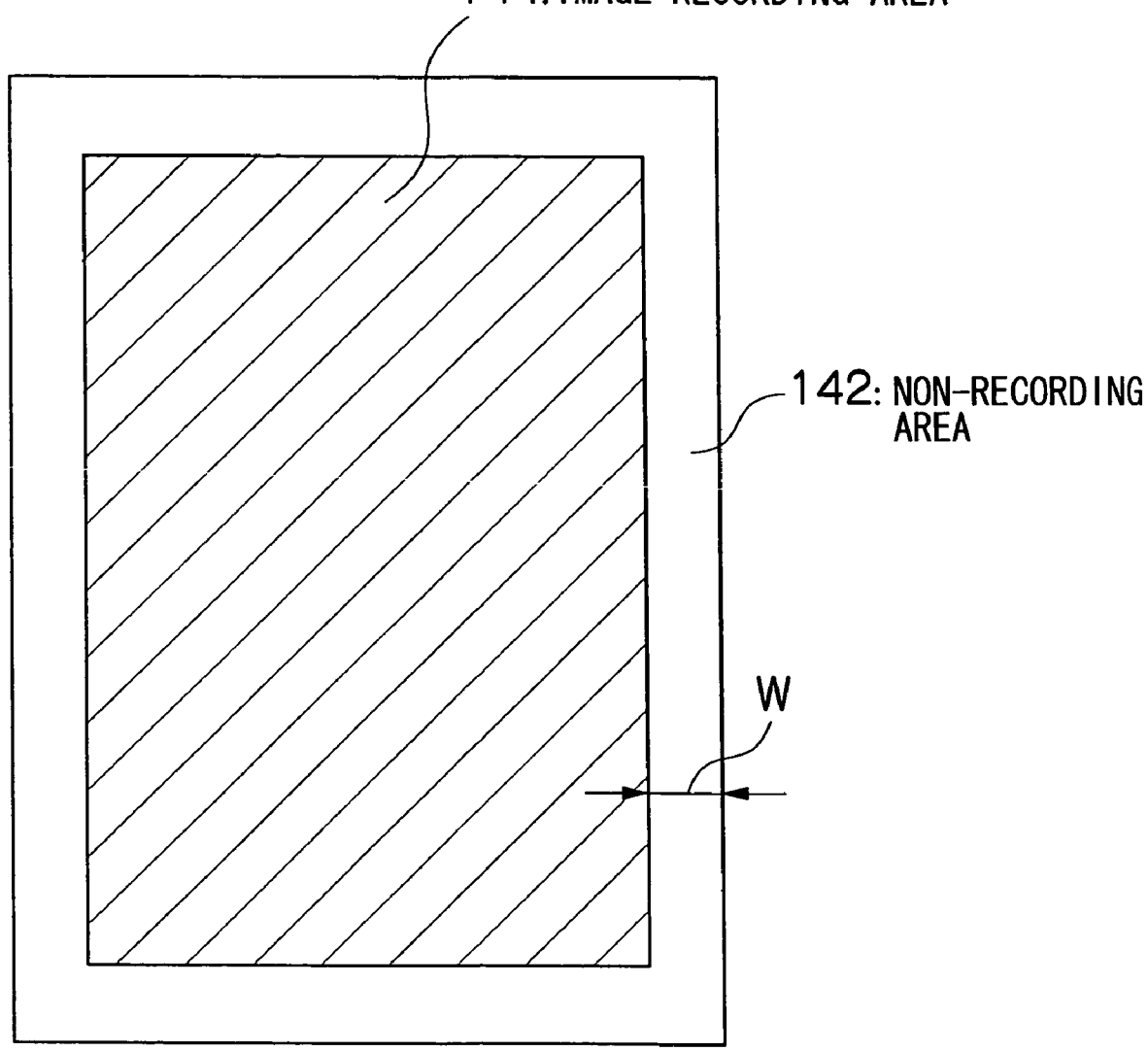
FIG. 14 is a diagram showing an example of forming a non-recording area in the entire periphery of the margin portion of the recording medium.

When creating a marginless printout, a preferable aspect in one in which a non-printing area 142 that is essentially undeterminable visually is provided as a white frame around the entire periphery of the edge portion of the recording medium 140, as in FIG. 14, and the image is recorded to the image recording area 144 therewithin. In FIG. 14, the non-recording area 142 is enlarged for convenient description, but the actual non-recording area 142 is sufficiently small to be essentially undeterminable visually.

In accordance with experimentation, as long as the blank range extends 60 µm or less from the edge 151 of the recording medium 150, as shown in FIG. 15, it is difficult to visually determine this portion as a white border even if it is designated as a non-print area 152. Furthermore, as long as the distance from edge 155 of the image 154 to the edge 151 of the recording medium 150 is 50 µm or less, it is difficult to perceive this non-printing area 152 as a white border.

Therefore, a preferable aspect entails performing recording control so that ejection does not occur within n dots from the edge 151 around the entire periphery of the recording medium 150, as shown in FIG. 15.

Here, n (natural number) satisfies the following formula:

$$Pt \times (n-1) + D < 60 \text{ µm} \tag{1}$$

where Pt is the dot pitch, and D is the dot diameter.

Thus, by not printing in the peripheral area within n dots from the edge 151 of the recording medium 150 so as to satisfy the above formula (1), ink can reliably be prevented from being deposited in the area outside the recording medium, and the problem of sullying the conveyance system and other components can be completely resolved.

As described above, in accordance with each of the embodiments in which the present invention is applied, the state of the recording medium is determined immediately before arriving at the print unit 12, and the image is processed to form an image with a size suitable for the area in which the recording medium is present in accordance with the determined information, so images can be recorded on the recording medium, and marginless printouts can be created without discharging ink to areas beyond the recording medium. In the embodiments of the present invention, when the recording medium is conveyed or positioned with a diagonal displacement from the ideal position, or when the recording medium has a special shape (a heart shape, or circular shape, for example) other than a rectangular shape (standard form), or in other special cases, a marginless image can be recorded on the recording medium without depositing ink in areas beyond the recording medium. In the case of an electrophotographic method, the amount of toner consumption can be reduced.

Modified Embodiment 1

In the above embodiments, an inkjet recording apparatus in which a page-wide, full-line recording head having a row of nozzles with a length corresponding to the entire width of the recording medium is used, but the scope of application of the present invention is not limited to this option alone, and also possible is an inkjet recording apparatus that uses a shuttle head for performing image recording as the short recording head reciprocally moves in the main scanning direction.

A configuration in which a shuttle head and a line CCD sensor (recording medium determination device) are used in combination can also perform the same function as a configuration in which the above full-line recording head and line CCD sensor are used in combination.

Modified Embodiment 2

In the above embodiments, an example is described in which a long full-line CCD sensor with a width that is greater than the recording medium is used as the recording medium determination device, but in the implementation of the present invention, an aspect is also possible in which a plurality of short line CCD sensors are used in combination for determining the corner portions as well as the left and right paper edge shape and position of the recording medium. The configuration in which this short line CCD sensor is used can also perform the same function as the configuration in which the long line CCD sensor is used.

Modified Embodiment 3

In the above embodiment an inkjet recording apparatus is described as an example of an image recording apparatus, but the scope of application of the present invention is not limited to this option alone. Other than the inkjet method, the present invention may also be applied to an image recording apparatus in the form of an electrophotographic printer.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus which records images on a recording medium by performing relative movement of the recording medium and a recording head provided with image recording elements, and controlling driving of the image recording elements according to image data, the apparatus comprising:
    a recording medium size determination device which determines a size of the recording medium to be used;
    a magnification setting device which sets magnification in order to generate an image larger than the size of recording medium according to input image data and the size of the recording medium determined by the recording medium size determination device;
    a first image processing device which generates image data with a size larger than the size of the recording medium from the input image data in accordance with the magnification set by the magnification setting device;
    a recording medium determination device which is disposed further upstream from the recording head in a relative movement direction of the recording medium by the relative movement and which acquires recording medium information including shape, orientation, and position of the recording medium;
    a second image processing device which generates image data with a size equal to or smaller than a recording medium area indicated by the recording medium information according to the recording medium information from the image data generated by the first image processing device; and
    a recording control device which controls the recording head according to the image data generated by the second image processing device, and records on the recording medium the image indicated by the image data.

2. The image recording apparatus as defined in claim 1, wherein the second image processing device performs a trimming processing for cutting an image range from the image data generated by the first image processing device in accordance with the recording medium area indicated by the recording medium information according to the recording medium information.

3. The image recording apparatus as defined in claim 1, wherein the magnification is set in the magnification setting device so as to allow an image to be generated that is larger than the recording medium in size without changing an aspect ratio of the image when the aspect ratio of the input image data and an aspect ratio of the recording medium are different from each other.

4. The image recording apparatus as defined in claim 1, wherein the magnification setting device sets the magnification so that an image with a predetermined magnification that is set in advance is obtained with respect to the size of the recording medium determined by the recording medium size determination device.

5. The image recording apparatus as defined in claim 1, wherein the magnification setting device sets the magnification in accordance with the recording medium information obtained by the recording medium determination device.

6. The image recording apparatus as defined in claim 1, wherein the recording control device performs recording control so as to form an area in which an image is not recorded with respect to an entire periphery of the recording medium within a range that extends from an edge of the recording medium inward over a distance that corresponds to n dots for which the following formula is satisfied:

$$Pt \times (n-1) + D < 60 \text{ mm}$$

where Pt is a dot pitch (mm), and D is a dot diameter (mm).

7. The image recording apparatus as defined in claim 1, wherein the recording head is a full-line recording head in which a plurality of image recording elements are arranged along a length corresponding to the entire width of the recording medium.

8. The image recording apparatus as defined in claim 1, wherein the recording medium determination device is a line CCD sensor having a structure in which a plurality of image reading elements are arranged in a line, and the line CCD sensor is disposed substantially parallel to the recording head.

9. An image recording apparatus which records images on a recording medium by performing relative movement of the recording medium and a recording head provided with image recording elements, and controlling driving of the image recording elements according to image data, the apparatus comprising:
    a recording medium determination device which is disposed further upstream from the recording head in a relative movement direction of the recording medium by the relative movement and which acquires recording medium information including shape, orientation, and position of the recording medium;
    an image processing device which modifies an input image in accordance with a recording medium area indicated by the recording medium information according to the recording medium information, so as to generate image data with a size equal to or smaller than the recording medium area; and
    a recording control device which controls the recording head according to the image data generated by the image processing device, and records on the recording medium the image indicated by the image data; wherein
    the recording head is a full-line recording head in which a plurality of image recording elements are arranged along a length corresponding to the entire width of the recording medium.

10. The image recording apparatus as defined in claim 9, wherein the recording control device performs recording control so as to form an area in which an image is not recorded with respect to an entire periphery of the recording medium within a range that extends from an edge of the recording medium inward over a distance that corresponds to n dots for which the following formula is satisfied:

$$Pt \times (n-1) + D < 60 \text{ mm}$$

where Pt is a dot pitch (mm), and D is a dot diameter (mm).

11. The image recording apparatus as defined in claim 9, wherein the recording medium determination device is a line CCD sensor having a structure in which a plurality of image reading elements are arranged in a line, and the line CCD sensor is disposed substantially parallel to the recording head.

12. An image recording method which records images on a recording medium by performing relative movement of the recording medium and a recording head provided with image recording elements, and controlling driving of the image recording elements according to image data, the method comprising:
a recording medium size determination step which determines a size of the recording medium to be used;
a magnification setting step which sets magnification in order to generate an image larger than the size of recording medium according to input image data and the size of the recording medium determined by the recording medium size determination step;
a first image processing step which generates image data with a size larger than the size of the recording medium from the input image data in accordance with the magnification set by the magnification setting step;
a recording medium determination step which uses a recording medium determination device disposed further upstream from the recording head in a relative movement direction of the recording medium by the relative movement and which acquires recording medium information including shape, orientation, and position of the recording medium;
a second image processing step which generates image data with a size equal to or smaller than a recording medium area indicated by the recording medium information according to the recording medium information from the image data generated by the first image processing step; and
a recording control step which controls the recording head according to the image data generated by the second image processing step, and records on the recording medium the image indicated by the image data.

13. The image recording method as defined in claim 12, wherein the second image processing step performs a trimming processing for cutting an image range from the image data generated by the first image processing step in accordance with the recording medium area indicated by the recording medium information according to the recording medium information.

14. The image recording method as defined in claim 12, wherein the magnification is set in the magnification setting step so as to allow an image to be generated that is larger than the recording medium in size without changing an aspect ratio of the image when the aspect ratio of the input image data and an aspect ratio of the recording medium are different from each other.

15. The image recording method as defined in claim 12, wherein the magnification setting step sets the magnification so that an image with a predetermined magnification that is set in advance is obtained with respect to the size of the recording medium determined by the recording medium size determination step.

16. The image recording method as defined in claim 12, wherein the magnification setting step sets the magnification in accordance with the recording medium information obtained by the recording medium determination step.

17. The image recording method as defined in claim 12, wherein the recording control step performs recording control so as to form an area in which an image is not recorded with respect to an entire periphery of the recording medium within a range that extends from an edge of the recording medium inward over a distance that corresponds to n dots for which the following formula is satisfied:

$$Pt \times (n-1) + D < 60 \text{ mm}$$

where Pt is a dot pitch (mm), and D is a dot diameter (mm).

18. The image recording method as defined in claim 12, wherein the recording head is a full-line recording head in which a plurality of image recording elements are arranged along a length corresponding to the entire width of the recording medium.

19. The image recording method as defined in claim 12, wherein the recording medium determination device is a line CCD sensor having a structure in which a plurality of image reading elements are arranged in a line, and the line CCD sensor is disposed substantially parallel to the recording head.

20. An image recording method which records images on a recording medium by performing relative movement of the recording medium and a recording head provided with image recording elements, and controlling driving of the image recording elements according to image data, the method comprising:
a recording medium determination step which uses a recording medium determination device disposed further upstream from the recording head in a relative movement direction of the recording medium by the relative movement and which acquires recording medium information including shape, orientation, and position of the recording medium;
an image processing step which modifies an input image in accordance with a recording medium area indicated by the recording medium information according to the recording medium information, so as to generate image data with a size equal to or smaller than the recording medium area; and
a recording control step which controls the recording head according to the image data generated by the image processing step, and records on the recording medium the image indicated by the image data; wherein
the recording head is a full-line recording head in which a plurality of image recording elements are arranged along a length corresponding to the entire width of the recording medium.

21. The image recording method as defined in claim 20, wherein the recording control step performs recording control so as to form an area in which an image is not recorded with respect to an entire periphery of the recording medium within a range that extends from an edge of the recording medium inward over a distance that corresponds to n dots for which the following formula is satisfied:

$$Pt \times (n-1) + D < 60 \text{ mm}$$

where Pt is a dot pitch (mm), and D is a dot diameter (mm).

22. The image recording method as defined in claim 20, wherein the recording medium determination device is a line CCD sensor having a structure in which a plurality of image reading elements are arranged in a line, and the line CCD sensor is disposed substantially parallel to the recording head.

* * * * *

UNITED STATES PATENT AND TRADEMARK OFFICE
CERTIFICATE OF CORRECTION

PATENT NO. : 7,207,639 B2  
APPLICATION NO. : 10/940727  
DATED : April 24, 2007  
INVENTOR(S) : Yasuhiko Kachi Page 1 of 1

It is certified that error appears in the above-identified patent and that said Letters Patent is hereby corrected as shown below:

On the Title item 73 Assignee Information:

The line reading "Minami-Ashigara-shi, Kanagawa, Japan" should read --Tokyo, JAPAN--

Signed and Sealed this

Twentieth Day of May, 2008

JON W. DUDAS  
*Director of the United States Patent and Trademark Office*